United States Patent
Vijayakumar et al.

(10) Patent No.: US 12,373,318 B2
(45) Date of Patent: Jul. 29, 2025

(54) CELLULAR FIELD TESTING AUTOMATION TOOL

(71) Applicant: DISH WIRELESS L.L.C., Englewood, CO (US)

(72) Inventors: Nikhil Rangaraajan Vijayakumar, Littleton, CO (US); Andrew Allan, Littleton, CO (US); In-Kyung Kim, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 36 days.

(21) Appl. No.: 18/228,848

(22) Filed: Aug. 1, 2023

(65) Prior Publication Data

US 2025/0045179 A1 Feb. 6, 2025

(51) Int. Cl.
*G06F 11/22* (2006.01)
*G06F 11/07* (2006.01)
*H04L 43/50* (2022.01)
*H04W 24/00* (2009.01)

(52) U.S. Cl.
CPC ...... *G06F 11/2247* (2013.01); *G06F 11/0793* (2013.01); *H04L 43/50* (2013.01); *H04W 24/00* (2013.01)

(58) Field of Classification Search
CPC ........... G06F 11/2247; G06F 11/0793; H04W 24/00; H04W 24/06; H04W 24/08; H04L 43/50
See application file for complete search history.

(56) References Cited

U.S. PATENT DOCUMENTS

2015/0189525 A1* 7/2015 Schmidt ................ H04W 24/08
455/436
2019/0215707 A1* 7/2019 Jackson .................. H04B 17/29

OTHER PUBLICATIONS

Nikhil Rangaraajan Vijayakumar, "Cellular Field Testing Automation Tool: Pass Fail Analysis and Test Scenario Recovery," U.S. Appl. No. 18/385,297, filed Oct. 30, 2023. (52 Pages).
Nikhil Rangaraajan Vijayakumar et al., "Cellular Field Testing Automation Tool: Automation of Emergency Location Accuracy Improvements," U.S. Appl. No. 18/540,581, filed Dec. 14, 2023. (46 Pages).
Nikhil Rangaraajan Vijayakumar et al., "Cellular Field Testing Automation Tool Including Carrier Aggregation Combination Alignment," U.S. Appl. No. 18/535,795, filed Dec. 11, 2023. (47 Pages).
Nikhil Rangaraajan Vijayakumar et al., "Cellular Field Testing Automation Tool: Automated Communication Channel Handover," U.S. Appl. No. 18/395,237, filed Dec. 22, 2023. (52 Pages).
Nikhil Rangaraajan Vijayakumar et al., "Cellular Field Testing Automation Tool Including Network Conditions Monitor, Audible and Visible Conclusion Alarms, and Data Stalls," U.S. Appl. No. 18/397,781, filed Dec. 27, 2023. (60 Pages).

* cited by examiner

*Primary Examiner* — Shelly A Chase
(74) *Attorney, Agent, or Firm* — Kipman T. Werking; Frontier IP Law PLLC

(57) ABSTRACT

A disclosed method may include (i) initiating a cellular field testing tool that tests a condition of cellular network connectivity of a device under test, (ii) checking, prior to starting a specific test of the cellular field testing tool, whether each precondition in a set of preconditions is satisfied, and (iii) preventing the cellular field testing tool from starting the specific test until each precondition in the set of preconditions is satisfied. Related systems and computer-readable mediums are further disclosed.

20 Claims, 15 Drawing Sheets

| Radiofrequency Measurement | |
|---|---|
| Serving PCI | 378 |
| DL TP(Mbps) | |
| Band | 2 |
| RSRQ(dB) | -18.56 |
| SINR(dB) | |
| RSRP(dBm) | -106.25 |
| EARFCN | 900 |
| UL TP(Mbps) | |

| Data |
|---|
| ⊟ TCP_DL_UL |
| App(TCP_DL (App_IPerf)) — 1008 |
| App(TCP_UL (App_IPerf)) — 1010 |
| ⊟ TCP_DL_ULDFIT_MULTI — 1012 |
| App(TCP_DL _DFIT(App_IPerf)) — 1014 |
| App(TCP_UL _DFIT(App_IPerf)) — 1016 |
| ⊟ UDP_DL_UL — 1018 |
| App(UDP_DL (App_IPerf)) — 1020 |
| App(UDP_UL (App_IPerf)) — 1022 |
| ⊟ VoNR + DATA — 1024 |
| Voice(VoNR Landline (Voice_Common)) — 1026 |
| App(IPERF_DL_TCP (App_IPerf)) — 1028 |
| ⊟ VoNR + YT — 1030 |
| App(YouTube Live (App_YouTube)) — 1032 |
| Voice(VoNR Landline (Voice_Common)) — 1034 |
| Voice — 1036 |
| 522_Testing (Voice_Common) |
| DUT_M1_TC_038 (Voice_Common) — 1040 |
| DUT_M2_TC_038 (Voice_Common — 1042 |
| Long Call - Houston (Voice_Common) — 1044 |
| Long Call - Test (Voice_Common) — 1046 |
| M1_MO_VoNR (Voice_Common) — 1048 |
| M1_MO_VoNR - Valdosta (Voice_Common) — 1050 |
| M2_MT_VoNR (Voice_Common) — 1052 |
| M2_MT_VoNR - Valdosta (Voice_Common) — 1054 |
| MO_VoNR (Voice_Common) — 1056 |
| MO_VoNR_LONG_DFIT (Voice_Common) — 1058 |
| MO_VoNR_MOS_M1 (Voice_Common) — 1060 |
| MO_VoNR_SHORT_DFIT (Voice_Common) — 1062 |
| MT_VoNR (Voice_Common) — 1064 |
| — 1066 |

FIG. 10

CELLULAR FIELD TESTING AUTOMATION TOOL

BRIEF SUMMARY

This disclosure is generally directed to a cellular field testing automation tool and improvements thereof. In one example, a method may include (i) initiating a cellular field testing tool that tests a condition of cellular network connectivity of a device under test, (ii) checking, prior to starting a specific test of the cellular field testing tool, whether each precondition in a set of preconditions is satisfied, and (iii) preventing the cellular field testing tool from starting the specific test until each precondition in the set of preconditions is satisfied. In these examples, a specific precondition in the set of preconditions can indicate an attribute of a location where the device under test is located or an attribute of cellular network connectivity of the device under test.

In some examples, the set of preconditions comprises at least two preconditions.

In some examples, the specific precondition within the set of preconditions tests a value relating to at least one of: latitude or longitude coordinates, radiofrequency conditions, an identifier of a modulation scheme, an absolute radiofrequency channel number, a physical cell ID, a measurement of bandwidth, or a carrier aggregation cell combination.

In some examples, the method can further include performing a remedial action in an attempt to satisfy each precondition within the set of preconditions. In some examples, the method can further include, after performing the remedial action, checking whether each precondition in the set of preconditions is satisfied.

In some examples, the remedial action comprises cycling an airplane mode on and off on the device under test.

In some examples, the remedial action comprises power cycling the device under test off and on.

In some examples, the remedial action comprises raising an audiovisual alarm.

In some examples, preventing the cellular field testing tool from starting the specific test comprises disabling a graphical user interface element for starting the specific test.

In some examples, the cellular field testing tool operates in part by connecting to both the device under test and a reference device.

A corresponding system may include a physical computing processor and a non-transitory computer-readable medium encoding instructions that, when executed by the physical computing processor, cause a computing device to perform operations comprising: (i) initiating a cellular field testing tool that tests a condition of cellular network connectivity of a device under test, (ii) checking, prior to starting a specific test of the cellular field testing tool, whether each precondition in a set of preconditions is satisfied, and (iii) preventing the cellular field testing tool from starting the specific test until each precondition in the set of preconditions is satisfied. In these examples, a specific precondition in the set of preconditions can indicate an attribute of a location where the device under test is located or an attribute of cellular network connectivity of the device under test.

A corresponding non-transitory computer-readable medium can encode instructions that, when executed by at least one physical processor of a computing device, cause the computing device to perform operations comprising: (i) initiating a cellular field testing tool that tests a condition of cellular network connectivity of a device under test, (ii) checking, prior to starting a specific test of the cellular field testing tool, whether each precondition in a set of preconditions is satisfied, and (iii) preventing the cellular field testing tool from starting the specific test until each precondition in the set of preconditions is satisfied. In these examples, a specific precondition in the set of preconditions can indicate an attribute of a location where the device under test is located or an attribute of cellular network connectivity of the device under test.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 9 shows an example screen of the graphical user interface of the cellular field testing automation tool.

FIG. 10 shows an example screen of the graphical user interface of the cellular field testing automation tool.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
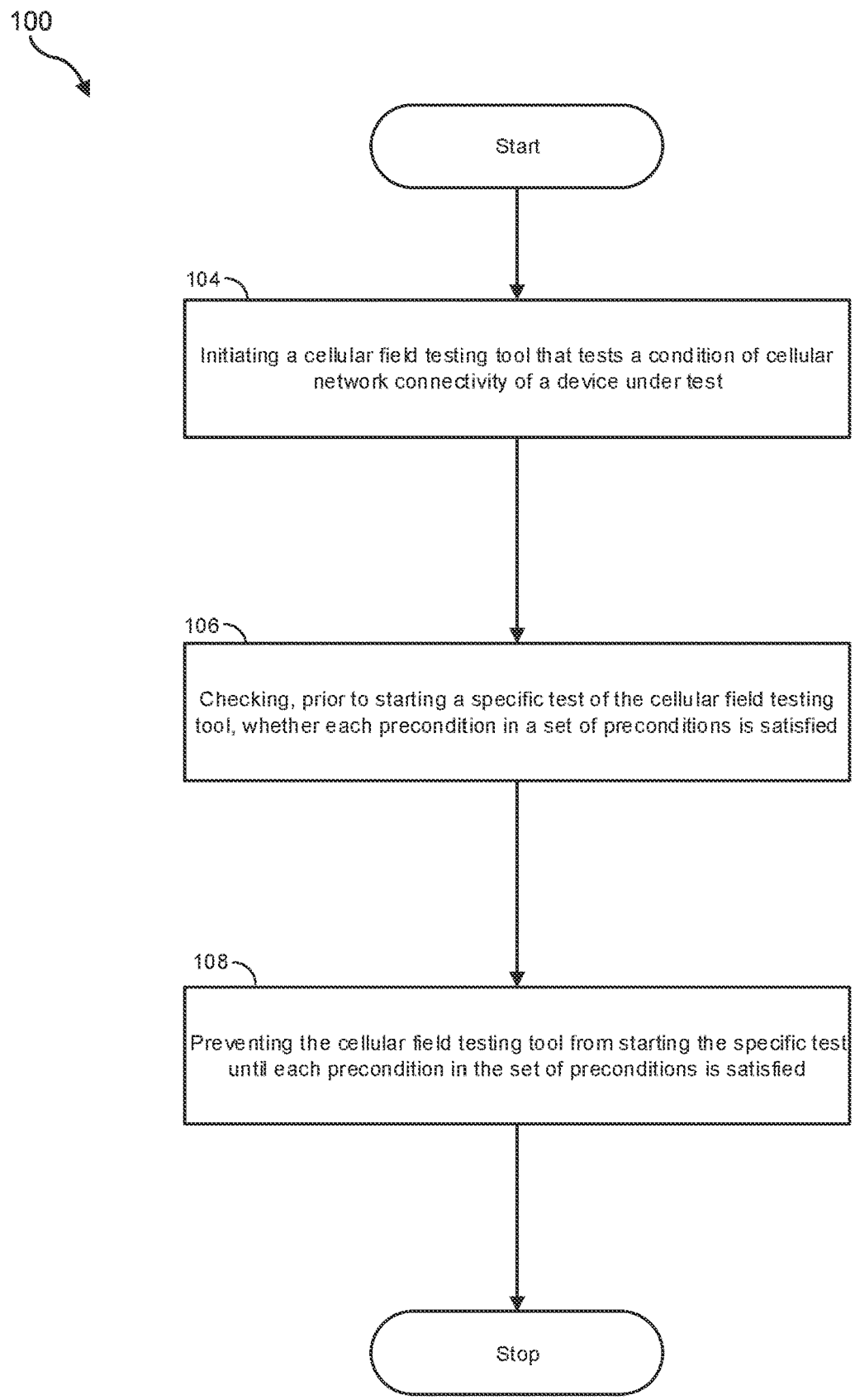
FIG. 1 shows a flow diagram for a method performed by a cellular field testing automation tool.

FIG. 1 shows a flow diagram for an example method 100 for operation of a cellular field testing tool. At step 104, one or more of the systems described herein may initiate a cellular field testing tool that tests a condition of cellular network connectivity of a device under test. At step 106, one or more of the systems described herein may check, prior to starting a specific test of the cellular field testing tool, whether each precondition in a set of preconditions is satisfied. Lastly, at step 108, one or more of the systems described herein may prevent the cellular field testing tool from starting the specific test until each precondition in the set of preconditions is satisfied.

In these examples, a specific precondition in the set of preconditions can indicate an attribute of a location where the device under test is located or an attribute of cellular network connectivity of the device under test. Illustrative examples of such preconditions are discussed in more detail below in connection with FIG. 3.

As used herein, the term "cellular field testing tool" generally refers to a tool that helps to test, when a device under test is connected to a cellular base station and/or a cellular network, one or more attributes of performance and/or cellular network connectivity provided to the device under test. In other words, the cellular field testing tool generally tests how well the device under test performs (or how well the network performs) when connected, and configured, in accordance with a particular configuration at a particular location. Cellular network carriers may be requested to, or required to, satisfy one or more specifications when smartphones and/or other items of user equipment are connected to cellular networks. To help ensure that the cellular network carriers satisfy these particular specifications, the cellular field testing tool can be used to connect to a device under test and then check or verify that the device under test is actually achieving cellular network connectivity that satisfies one or more corresponding performance metrics, which may include dozens or even hundreds of such performance metrics.

Despite the above, some cellular field testing tools can suffer from one or more deficiencies or sub-optimizations and these tools may, therefore, benefit from one or more improvements, including improvements that automate one or more procedures that assist a user with operating the tool. These improved cellular field testing tools can, therefore, enable employees, contractors, and/or administrators of the cellular network carriers to appropriately operate these tools even if the administrators lack a degree of experience, sophistication, and/or detailed education regarding the performance and operation of the tools. In other words, automated improvements for the cellular field testing tools can enable less sophisticated operators to operate the tools in a more streamlined and/or user-friendly manner. Consequently, these improvements can furthermore reduce a burden on the carriers of training and/or educating these operators, while further increasing a potential pool of candidate operators for carrying out these testing procedures, as discussed in more detail below.

Similarly, as used herein, the term "precondition" can generally refer to one or more conditions that must be satisfied prior to the starting of a specific and corresponding cellular field testing tool test. Generally speaking, these preconditions refer to contextual preconditions that help to establish that the cellular field testing tool, when operating, will perform successfully and obtain results that are valid and useful (see the discussion of FIG. 3 below). Accordingly, the term "precondition," as used herein, generally does not refer to universal software preconditions that would generally apply even outside of the context of cellular field testing tools. For example, the term "precondition," as used herein, will generally not refer to a requirement to powering on the computing device executing the cellular field testing tool, in view of the fact that such a precondition would generally apply to all software even outside of the context of cellular field testing tools.

As used herein, the term "set" can generally refer to a collection of at least one precondition, unless indicated otherwise. Generally speaking, such cellular testing tools may benefit from checking or verifying a larger multitude of preconditions, as discussed in more detail below.

Figure 2:
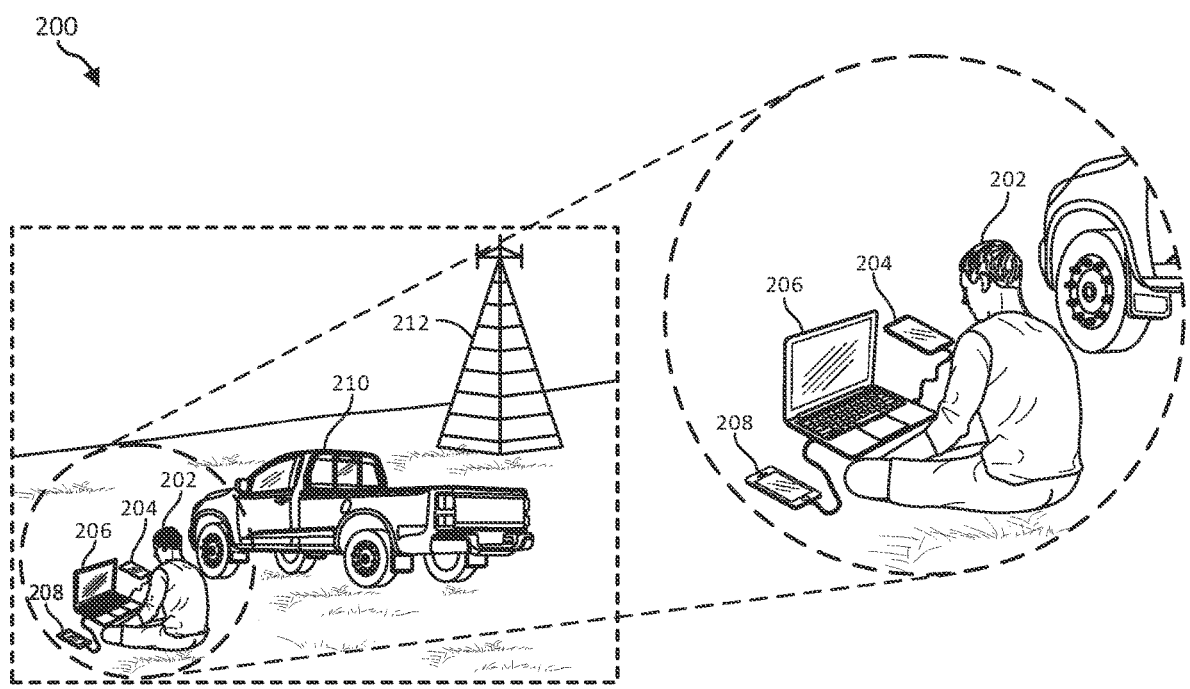
FIG. 2 shows a user operating a cellular field testing automation tool.

FIG. 2 shows an illustrative diagram 200 that helps to establish a context in which method 100 may be performed. As further shown in this diagram, a user or operator 202 may execute a cellular field testing tool on an item of user equipment or a computing device, such as a laptop 206. At the same time, the user may connect to additional computing devices and/or items of user equipment, such as a smartphone 204 and/or smartphone 208. In some examples, smartphone 204 may correspond to a device under test, where a smartphone 208 may correspond to a reference device (e.g., a device that may have been previously tested and/or verified as operating within specifications), or vice versa. For completeness, diagram 200 also illustrates how user 202 may have driven a truck 210 to a remote area at a particular location, where the user may establish cellular network connectivity with a cellular base station 212.

Figure 3:
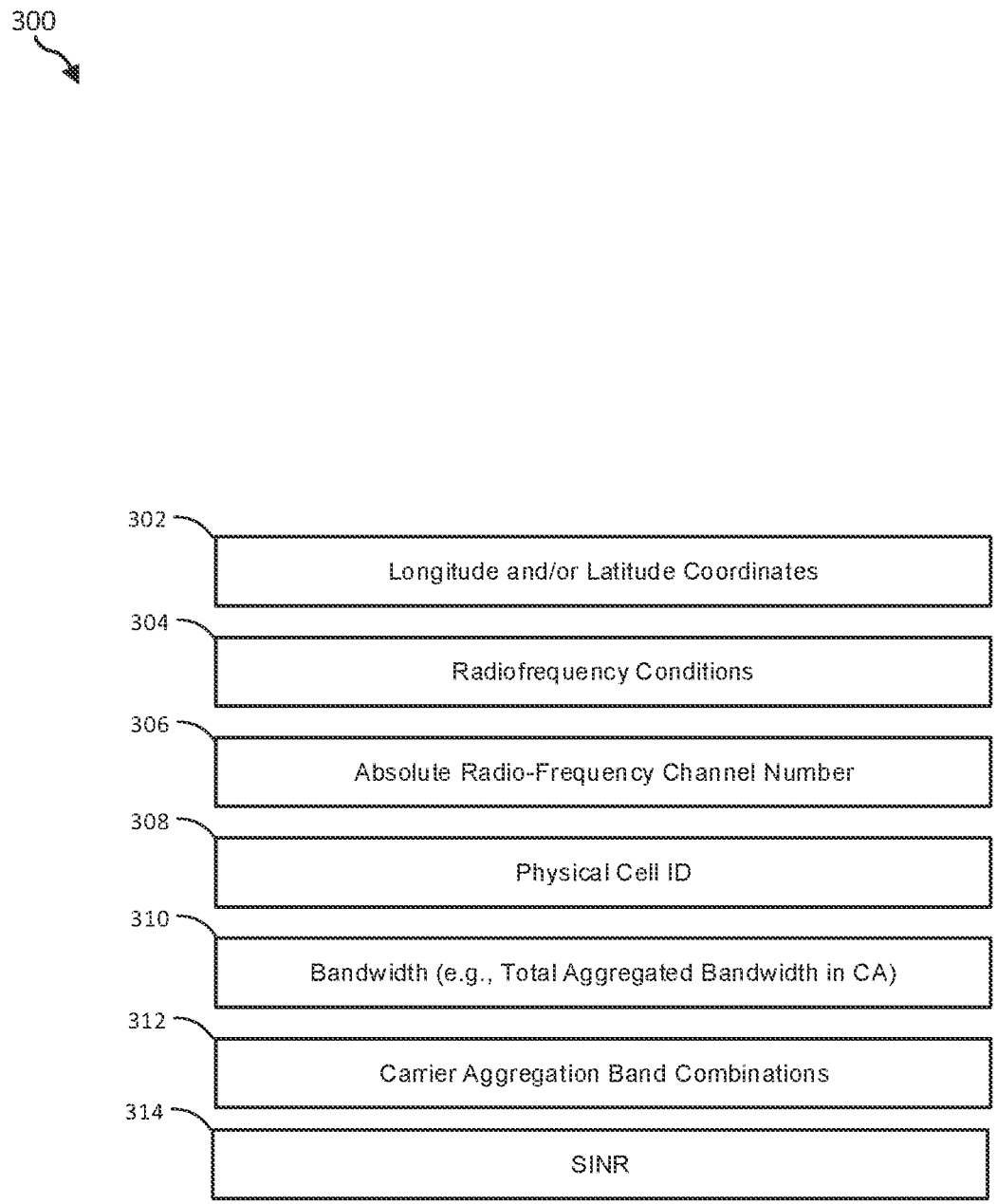
FIG. 3 shows example preconditions that can be checked prior to enabling a user to operate the cellular field testing automation tool.

FIG. 3 shows a helpful list 300 of illustrative examples of preconditions that can be checked in accordance with method 100. Precondition 302 includes longitude and/or latitude coordinates. For example, performing method 100 may involve verifying that the device under test and/or the reference device (which can generally be co-located as shown in FIG. 2) are sufficiently close to, or located within, particular geolocation coordinates or perimeters. Precondition 304 includes radiofrequency conditions. Illustrative examples of such aerial frequency conditions may include one or more of the following values or measurements: Reference Signal Received Power (RSRP), Reference Signal Received Quality (RSRQ), and/or Signal to Interference plus Noise Ratio (SINR). Other illustrative examples of radio frequency conditions, which may be more or less applicable or relevant, in various embodiments, than those listed above, may further include Received Signal Strength Indicator (RSSI), Signal to Noise plus Interference Ratio (SNIR), Signal to Noise Ratio (SNR), Arbitrary Strength Unit (ASU), and/or Signal to Noise Ratio (RS SINR or RSSNR).

Returning to FIG. 3, precondition 306 may include an Absolute RadioFrequency Channel Number (ARFCN). This particular value may refer to a unique number given to each radio channel in a Global System for Mobile Communications (GSM) cellular network. Precondition 308 may refer to a physical cell ID. As illustrated in FIG. 2, the device under test and/or the reference device may be connected to a computing device, such as a laptop, that executes the cellular field testing tool. These connections may be wired or wireless, and wired connections may be formatted to conform with the PCI protocol, USB protocol, BlueTooth, etc. Helping to ensure proper connections to the computing device that is executing the cellular field testing tool helps to ensure that, when the tool executes a specific test, the corresponding connection with the device under test and/or reference device is appropriately established to successfully interface with the logging tool to collect upload and download packets sent and received from the device under test and/or the reference device. Precondition 310 may refer to the total, aggregated bandwidth of both the device under test and the reference device, if carrier aggregation (CA) is applicable, to ensure that the device under test and the reference device are conducted under the same network conditions. Lastly, precondition 312 can refer to carrier aggregation cell combinations. As understood by those having skill in the art, some cellular network carriers can aggregate portions of spectrum and/or their cellular networks (e.g., for roaming purposes, etc.). Precondition 312 may help to check and verify that both the device under test and the reference device have the same band configurations aggregated prior to the beginning of performing one or more specific tests by the cellular field testing tool. Precondition 314 can refer to Signal to Interference and Noise Ratio (SINR).

Figure 4:
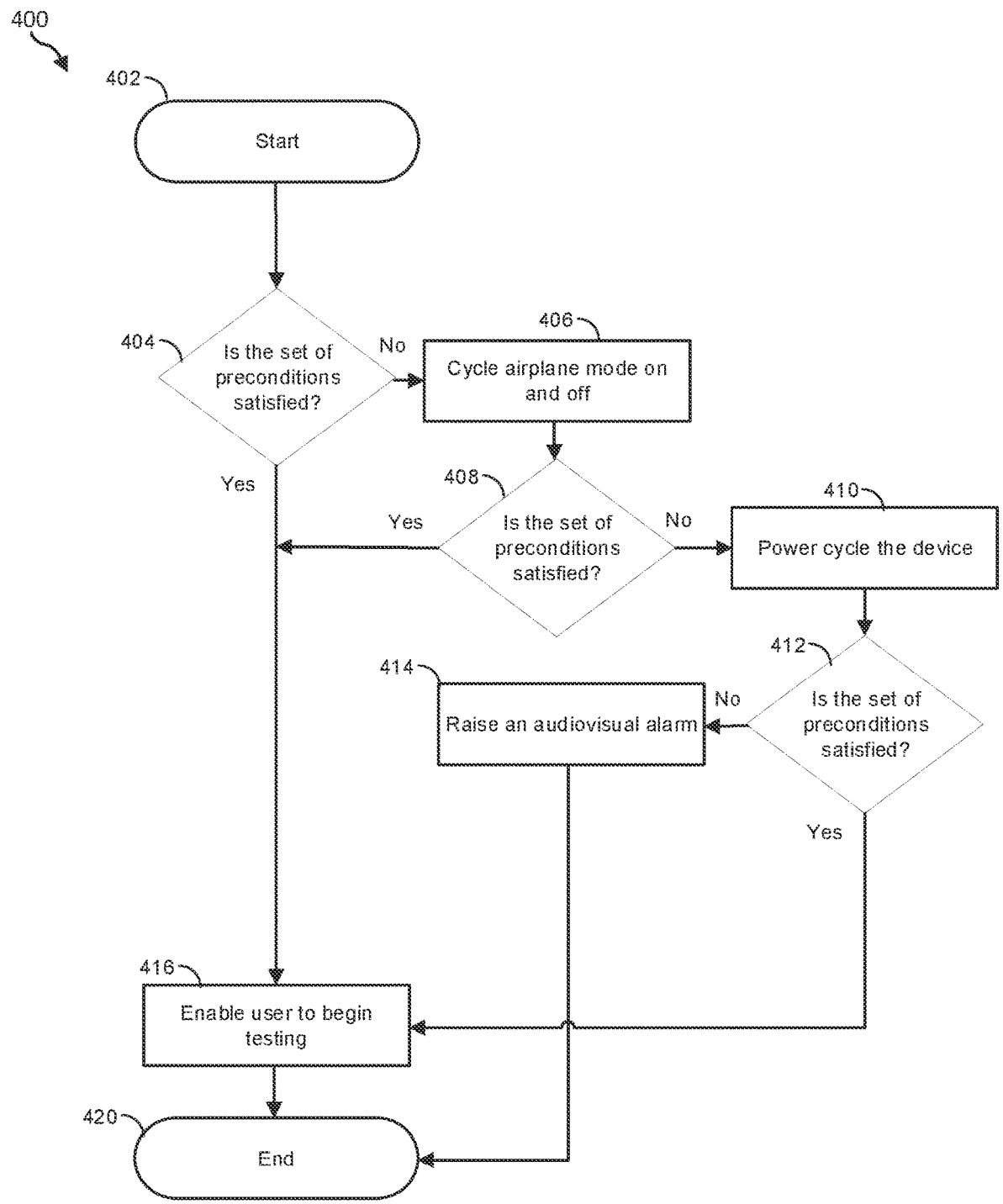
FIG. 4 shows another flow diagram for a method performed by a cellular field testing automation tool.

FIG. 4 shows a flow diagram for an example method 400 relating to operation of the cellular field testing tool. Method 400 helps to illustrate how, when checking for whether preconditions are satisfied, embodiments described herein may perform a series of different remedial actions in response to detecting that the preconditions are actually not satisfied. In some examples, the series of remedial actions may be increasingly staggered in terms of seriousness or severity, as discussed further below. The example of method 400 includes a series of three separate and staggered remedial actions (see step 406, step 410, and step 414). Although this example focuses on a set of three remedial actions, any suitable number or arbitrary number of remedial actions may be performed, in a parallel manner, as understood by those having skill in the art, with the goal of eventually achieving the successful satisfaction of all the preconditions. Moreover, although this example focuses on checking the exact same set of preconditions at each stage of the staggered process, in other examples the exact number or identity of the members of the set of preconditions may vary, slightly or more than slightly, between the different stages of the staggered process.

At step 402, method 400 may begin. At decision step 404, method 400 may perform a first check of whether the set of preconditions is satisfied. If the answer is yes at decision step 404, then method 400 may proceed to step 416, at which point method 400 may enable the user to begin a specific test, as discussed in more detail below. Alternatively, if the answer is no at decision step 404, then method 400 may proceed to step 406, at which point method 400 may cycle airplane mode on and off the specific device that is failing the preconditions (e.g., the device under test and/or the reference device).

From step 406, method 400 may proceed to decision step 408, which may correspond to the second stage of a staggered series of stages of testing whether the overall set of preconditions has been satisfied. In particular, at decision step 408, method 400 may check for the second time whether the set of preconditions has been satisfied. If the answer is no at decision step 408, then method 400 may proceed to step 410, at which point method 400 may power cycle the device that is failing the preconditions. Alternatively, again, if the answer is yes at decision step 408, then method 400 may proceed to step 416, at which point method 400 may enable the user to begin a specific test.

Lastly, as a third stage of method 400, at decision step 412, method 400 may again check whether the set of preconditions has been satisfied. If the answer is yes at decision step 412, then method 400 may proceed to step 416 again, at which point method 400 may enable the user to begin a specific test. Alternatively, if the answer is no at decision step 412, then method 400 may proceed to step 414, at which point method 400 may raise an audio and/or visual alarm to the user (see also the discussion of FIG. 14 below). At step 420, method 400 may conclude.

Figure 5:
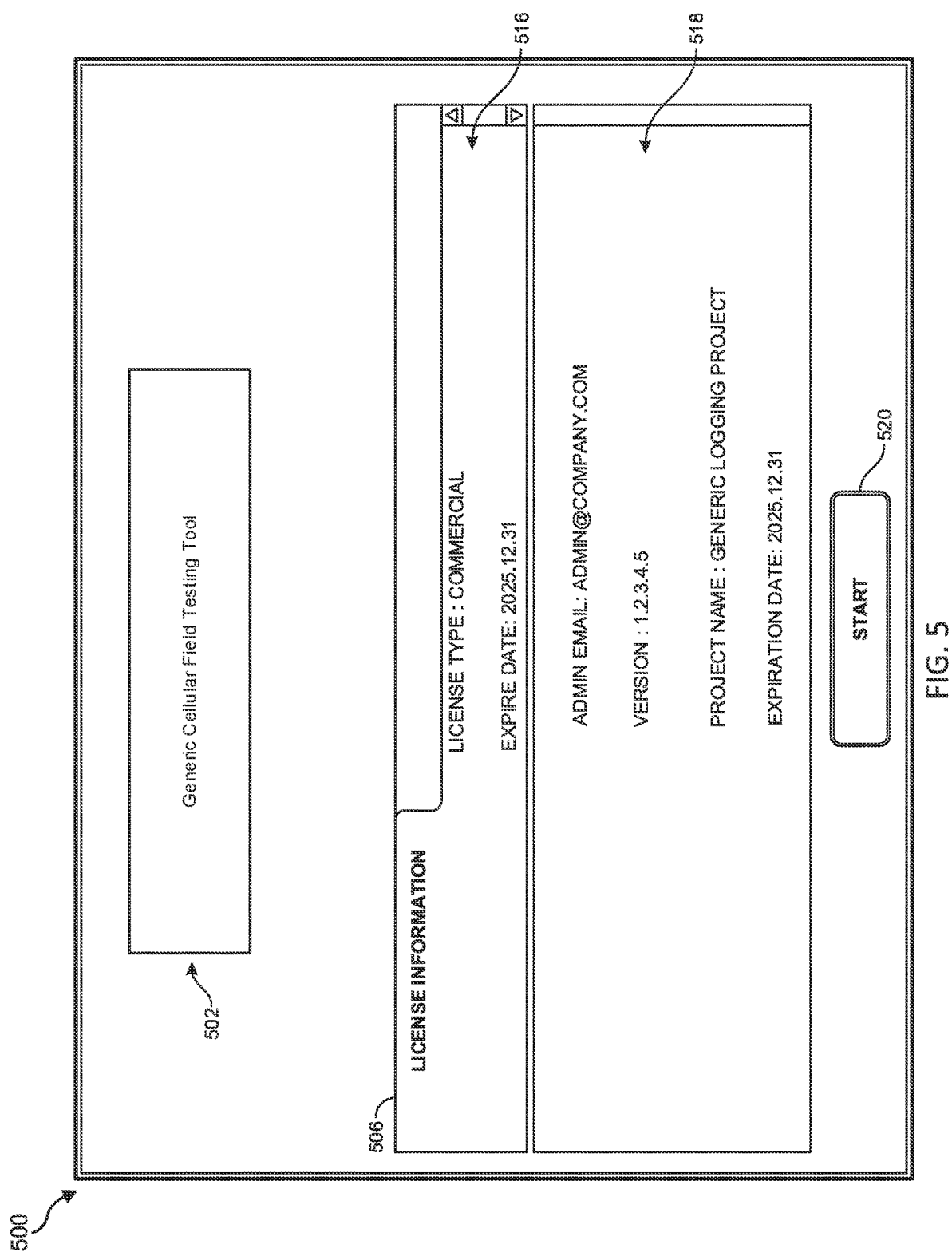
FIG. 5 shows an example introductory screen of a graphical user interface of the cellular field testing automation tool.

FIG. 5 shows a diagram 500 for an introductory screen of a graphical user interface for a cellular field testing tool that can be operated in accordance with method 100 and/or method 400. As further shown in diagram 500, this introductory screen may include a headline 502 that indicates the name of the particular cellular field testing tool and/or software development company providing such a tool. In the simplified example of this figure, headline 502 indicates a generic name of "Generic Cellular Field Testing Tool." A graphical user interface element 506 may indicate license information. A window 516 may further provide information about the corresponding license, including its type and/or expiration date. Below that, a window 518 may further provide information about contacting a corresponding cellular network carrier ("company") that may be licensing and/or operating the corresponding software, as well as indications of a version of the software, a project name, and/or an expiration date of the license.

Figure 6:
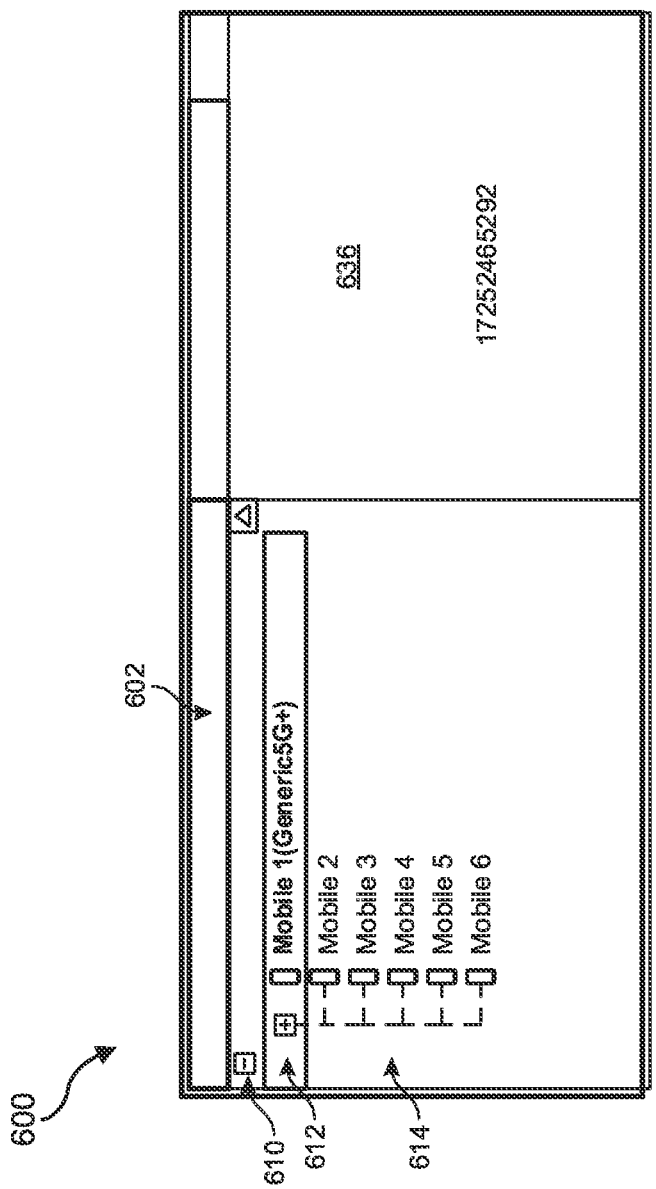
FIG. 6 shows an example screen of the graphical user interface of the cellular field testing automation tool.

FIG. 6 shows a diagram 600 of a screen of the same graphical user interface that may be presented as a result of selecting a button 520 (see FIG. 5) for starting execution of the corresponding cellular field testing tool. As further shown in diagram 600, the graphical user interface may include a devices list 602, and a drop-down menu 610 may indicate a list of mobile devices for testing. A graphical user interface element 612 may indicate the selection or connection of a specific mobile device ("Generic5G+" in this example). Moreover, a graphical user interface element 614 may further indicate a list of other candidate devices that may be selected or configured for testing. As further shown in this diagram, a portion 636 of diagram 600 indicates that the tool has connected to a particular phone number of the same mobile device corresponding to graphical user interface element 612.

Figure 7:
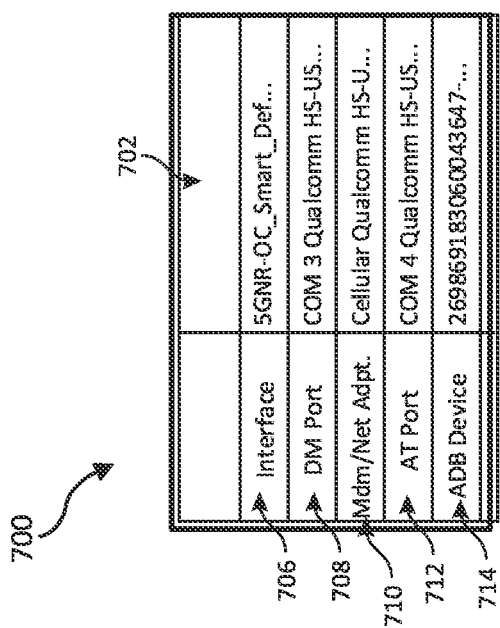
FIG. 7 shows an example screen of the graphical user interface of the cellular field testing automation tool.

FIG. 7 shows a diagram 700 of another screen of the same graphical user interface after the mobile device has been connected to initiate one or more specific tests. At this stage of operating the cellular field testing tool, the user or operator may toggle or configure one or more fields with values to set up specific testing procedures for each mobile device. Diagram 700 shows a portion 702 which corresponds to a the connected mobile device of FIG. 6. A set of graphical user interface elements 706-714 show respective attributes or fields that the operator can toggle or configure to set up further testing procedures. In particular, as shown in this figure, the operator can configure, for each connected mobile device, an interface, a DM port (diagnostics and monitoring port), an MDM (Mobile Device Management) net adapter value, an AT port, and/or an Android Debug Bridge device value. In various examples, one or more of these values may be required to be configured to proceed with specific testing procedures. These examples of parameters that can be configured prior to beginning specific testing procedures are merely illustrative and, in other examples, additional or alternative parameters may be configured as appropriate.

Figure 8:
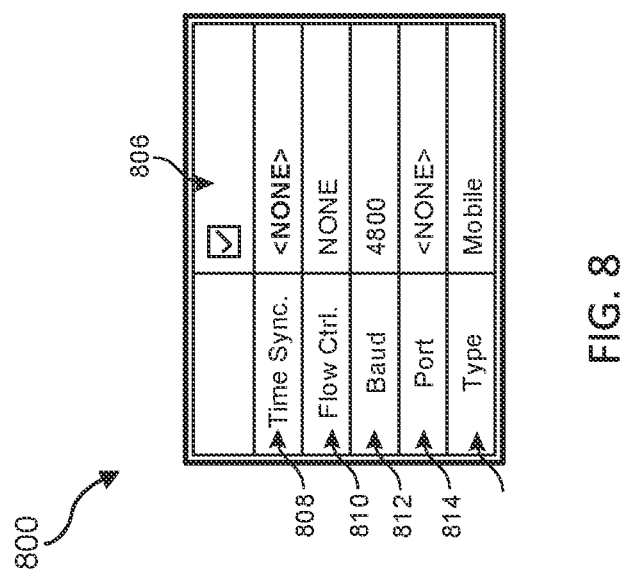
FIG. 8 shows an example screen of the graphical user interface of the cellular field testing automation tool.

FIG. 8 shows a diagram 800 that elaborates on a different aspect of the graphical user interface that was further shown as diagram 700. In particular, the corresponding diagram further illustrates how, prior to beginning specific testing procedures, the operator of the cellular field testing tool may toggle a Global Positioning System (GPS) field 806 to enable GPS functionality on one or more specific mobile devices that are under test.

FIG. 9 shows a diagram 900 of another screen of the graphical user interface of the cellular field testing tool. As further shown in this diagram, the graphical user interface can indicate to the operator one or more radiofrequency measurements and corresponding network connection attributes. A headline 908 may indicate "Radiofrequency Measurement." Rows 918-932 of diagram 900 may list respective measurement values relating to radiofrequency connectivity.

FIG. 10 shows a diagram 1000 of another screen of the graphical user interface of the cellular field testing tool. As further shown in this figure, rows 1008-1066 may specify the names of different respective tests that the cellular field testing tool can perform, which can be user-customized, and these various specific tests may be categorized as either various different tests for testing data connections (see rows 1008-1036) and/or various different tests for testing voice connections (see rows 1040-1066).

Figure 11:
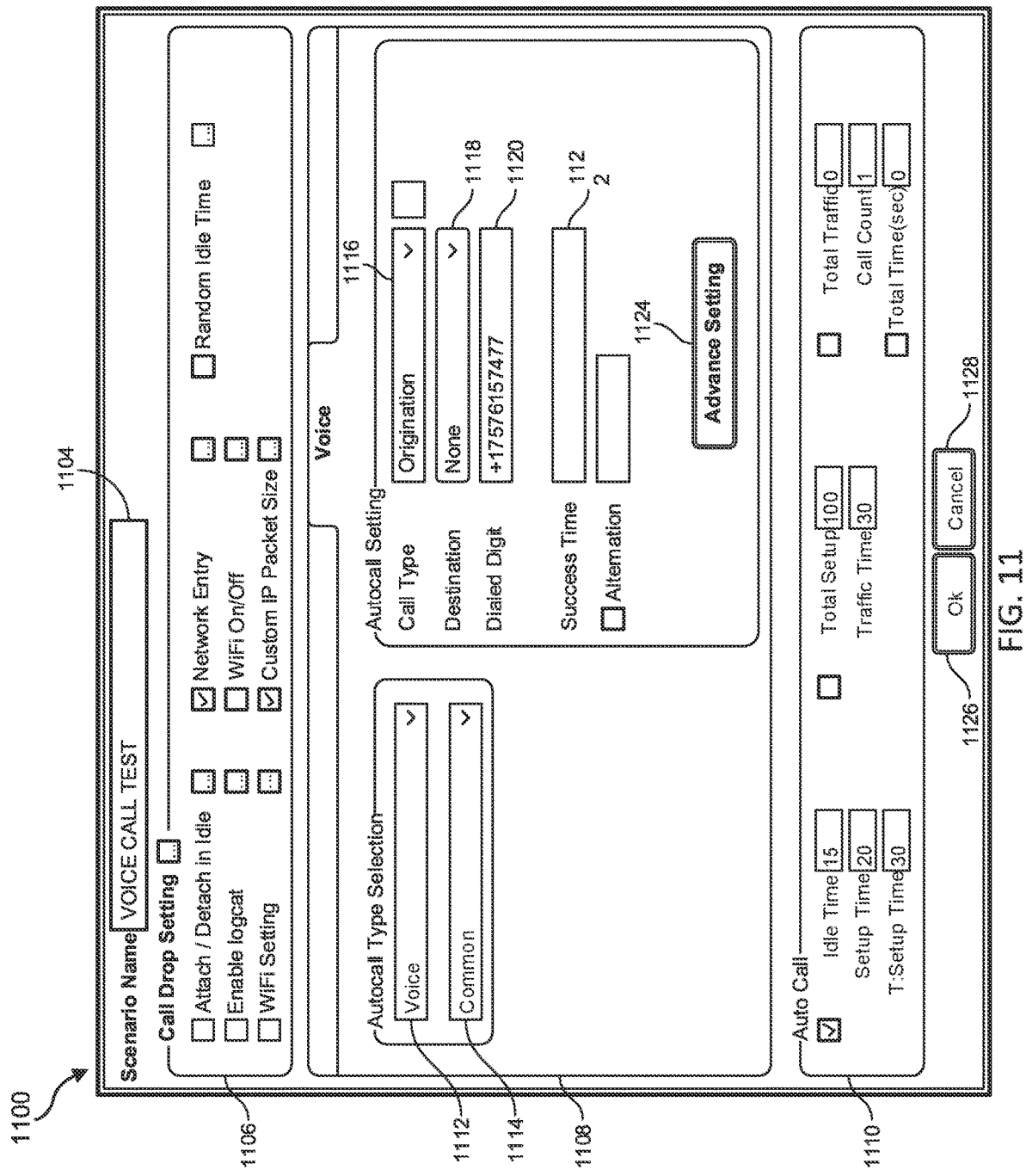
FIG. 11 shows an example screen of the graphical user interface of the cellular field testing automation tool.

FIG. 11 shows a diagram 1100 of another screen of the graphical user interface of the cellular field testing tool. As shown in this figure, diagram 1100 may include a scenario name 1104, as well as a panel 1106 of various fields or options that the operator can configure when setting up this particular test ("VOICE CALL TEST"). Another panel 1108 may further include a similar but distinct set of various fields or options that the operator can configure appropriately. Lastly, another panel 1114 may enable the user to further specify various values for another set of corresponding parameters as part of the configuration before initiating or executing the specific testing procedure. A button 1128 may enable the operator to cancel the current set of configuration procedures, and a button 1126 may enable the user to finalize configuration settings and proceed to the next stage of specific testing procedures.

Figure 12:
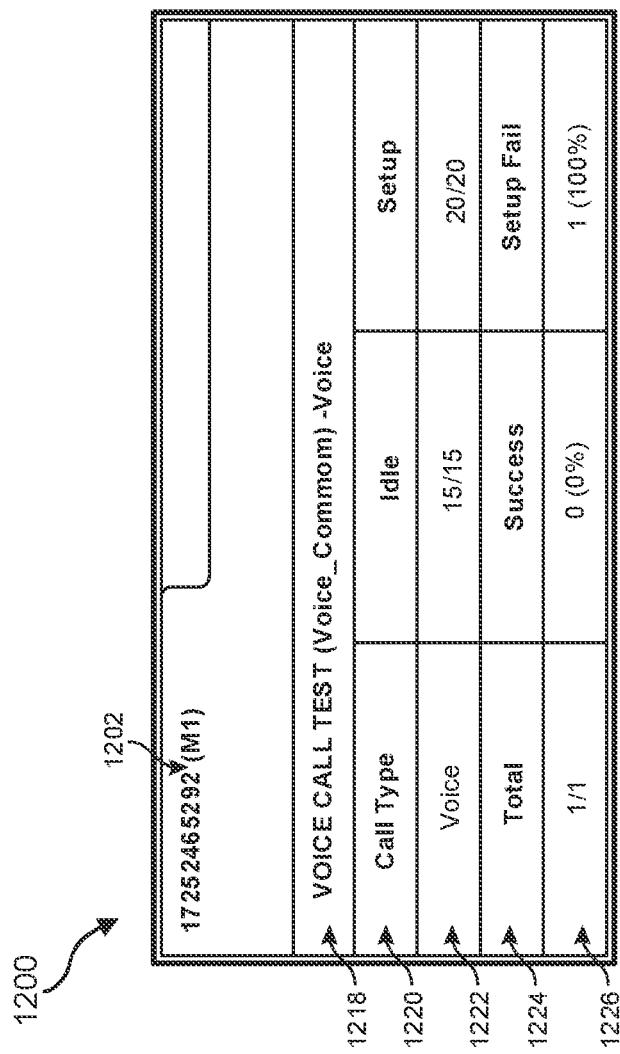
FIG. 12 shows an example screen of the graphical user interface of the cellular field testing automation tool.

FIG. 12 shows a diagram 1200 of another screen of the graphical user interface of the cellular field testing tool. An indicator 1202 may identify the phone number for the corresponding device under test. Generally speaking, the data displayed within the lower body of the window of diagram 1200 may display results, in real time, as one or more specific tests of the cellular field testing tool are being executed. In particular, a row 1220 and another respective row 1224 may display identifiers, within respective columns, to identify the type of resulting output information displayed in the rows that are immediately beneath these identifying rows. Thus, as further shown within diagram 1200, row 1222 may display values corresponding to the identifiers shown within row 1220, and row 1226 may display values corresponding to the identifier shown within row 1224. By way of illustrative example, row 1222 indicates that the call type (as indicated by row 1220) is "voice" within the same respective column.

Figure 13:
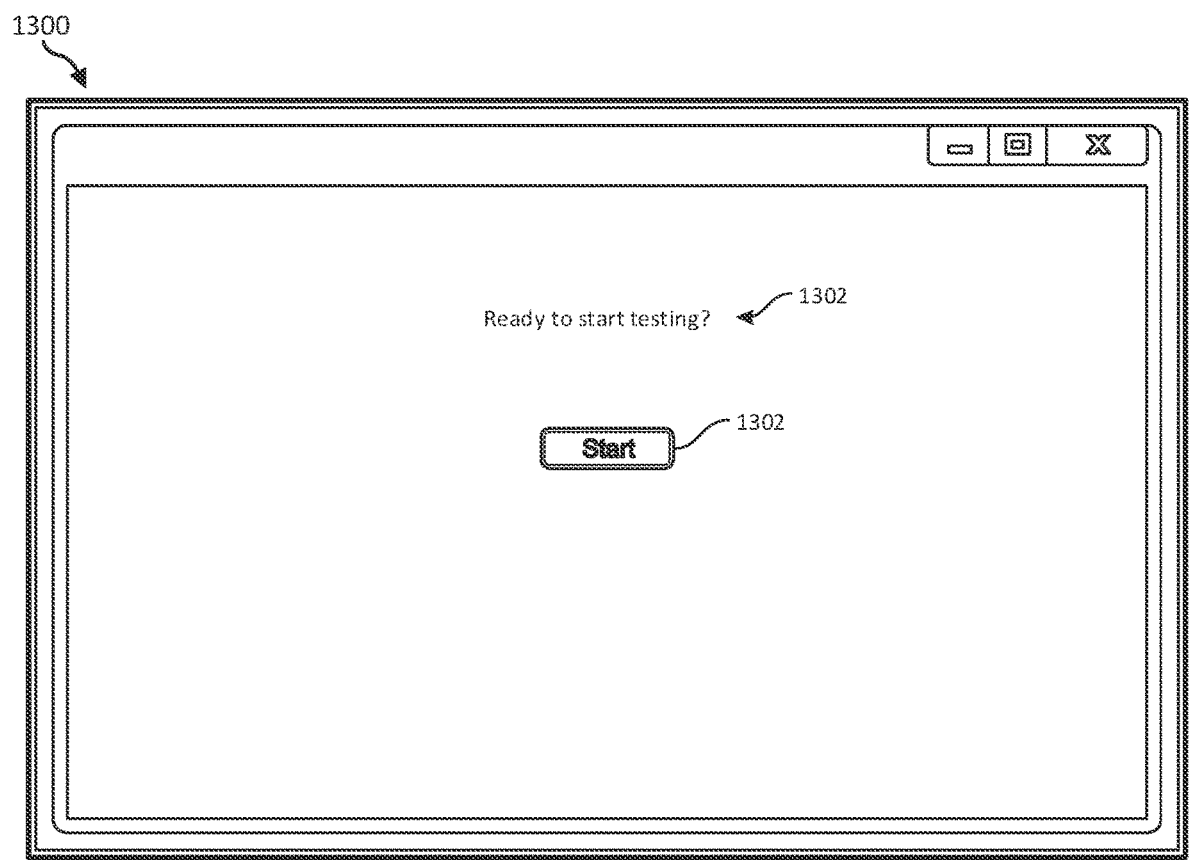
FIG. 13 shows an example screen of the graphical user interface of the cellular field testing automation tool.

FIG. 13 shows a diagram 1300 of a graphical user interface of the same cellular field testing tool that enables, or disables, the option for the operator to begin a specific test, including the specific tests that are identified or listed above by way of illustrative example. A prompt 1302 may inquire of the user whether the user is ready to begin testing procedures, after any one or more of the configuration and setup procedures that are outlined above have been performed, consistent with the discussion of FIGS. 5-12, for example. Graphical user interface element 1302, when this element is enabled, may allow the user to toggle the element and thereby finally begin specific testing procedures in accordance with the previous configuration and setup.

Nevertheless, as previously discussed above in connection with method 100 and method 400, graphical user interface element 1302 and/or any suitable substitute for inputting information within the computing arts, may be disabled if the set of preconditions has not been satisfied. Thus, in various examples, graphical user interface element 1302 may be displayed in a "grayed out" manner such that, although the user can read a dimmer or grayer version of the "Start" text, attempting to toggle or select graphical user interface element 1302 may not result in any corresponding functionality. In other words, when not enabled, graphical user interface element 1302 may simply correspond to essentially frozen pixels that remain the same regardless of whether the user attempts to toggle them or not. Those having skill in the art will readily understand that any other suitable mechanism for disabling an input mechanism or graphical user interface button may be used to achieve essentially the same purpose of preventing the user from beginning a specific test procedure prior to the preconditions all being satisfied. Moreover, as soon as the preconditions are satisfied, perhaps after one or more stages of performing a series of remedial actions (see FIG. 4), graphical user interface element 1302 may be enabled such that the user can successfully toggle it to trigger the initiation of specific testing procedures.

As further discussed above, in some scenarios, even after performing a series of remedial actions (see the three remedial actions of FIG. 4), the set of preconditions may nevertheless remain unsatisfied. In that scenario, the computing device executing the cellular field testing tool may issue an alert to the user. In some related methodologies, there may be no such alert and/or the alert may be inconspicuous. Accordingly, this disclosure envisions alerts that are both conspicuous and audiovisual in nature such that the user receives both an audio alert as well as a visual alert, thereby clearly bringing this information to the attention of the user.

Figure 14:
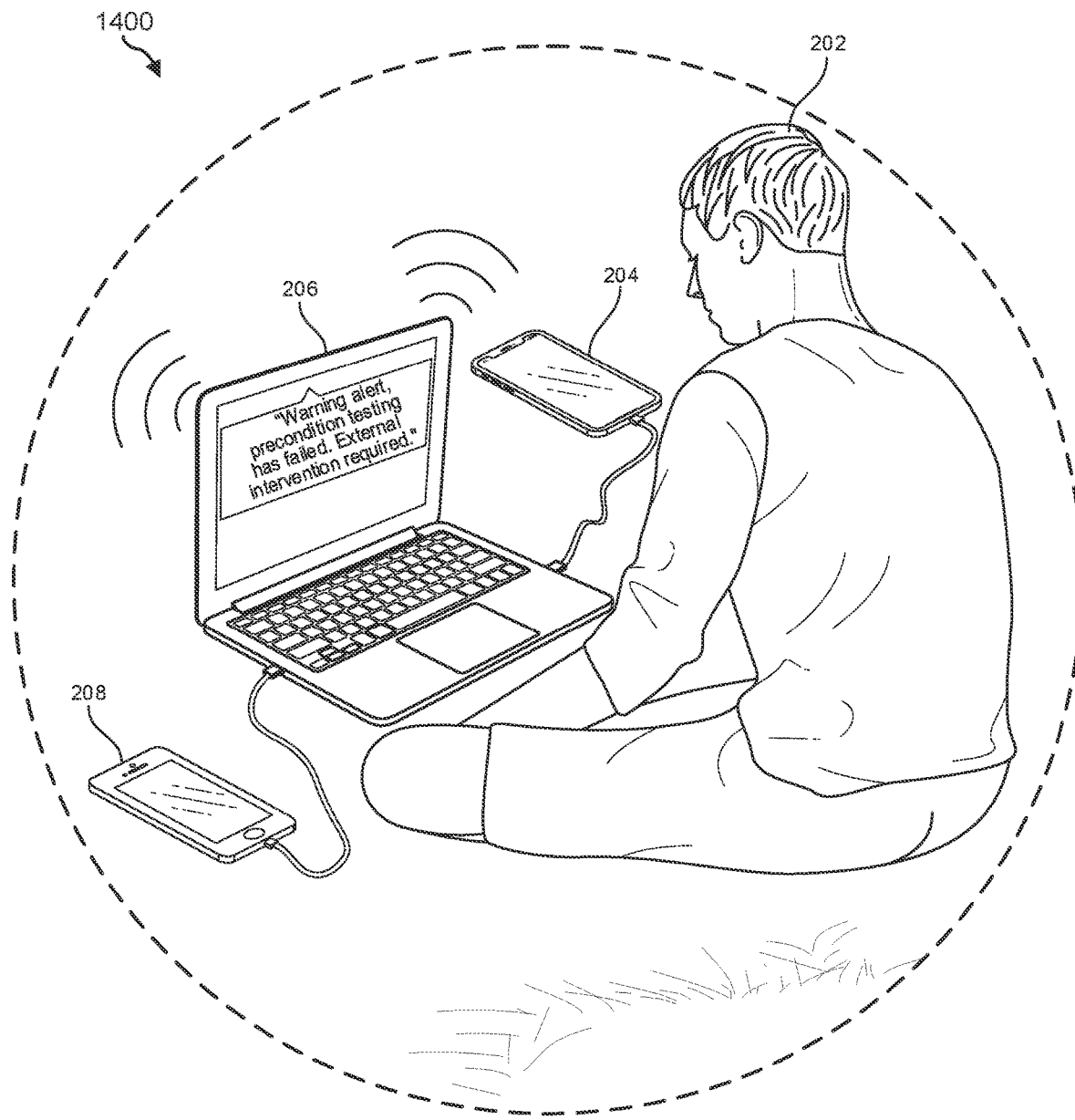
FIG. 14 shows a magnified view of the user operating the cellular field testing automation tool.

FIG. 14 shows a diagram 1400 of a magnified view of user 202 operating laptop 206 in connection with smartphone 204 and smartphone 208. As shown in this diagram, the visual alert may indicate to the user "Warning alert, precondition testing has failed. External intervention required." Those having skill in the art will readily ascertain that the particular text of this specific alert is merely an example for illustrative purposes and, in other examples, different variations and/or substitutes of such warnings may be used appropriately to notify the user.

Figure 15:
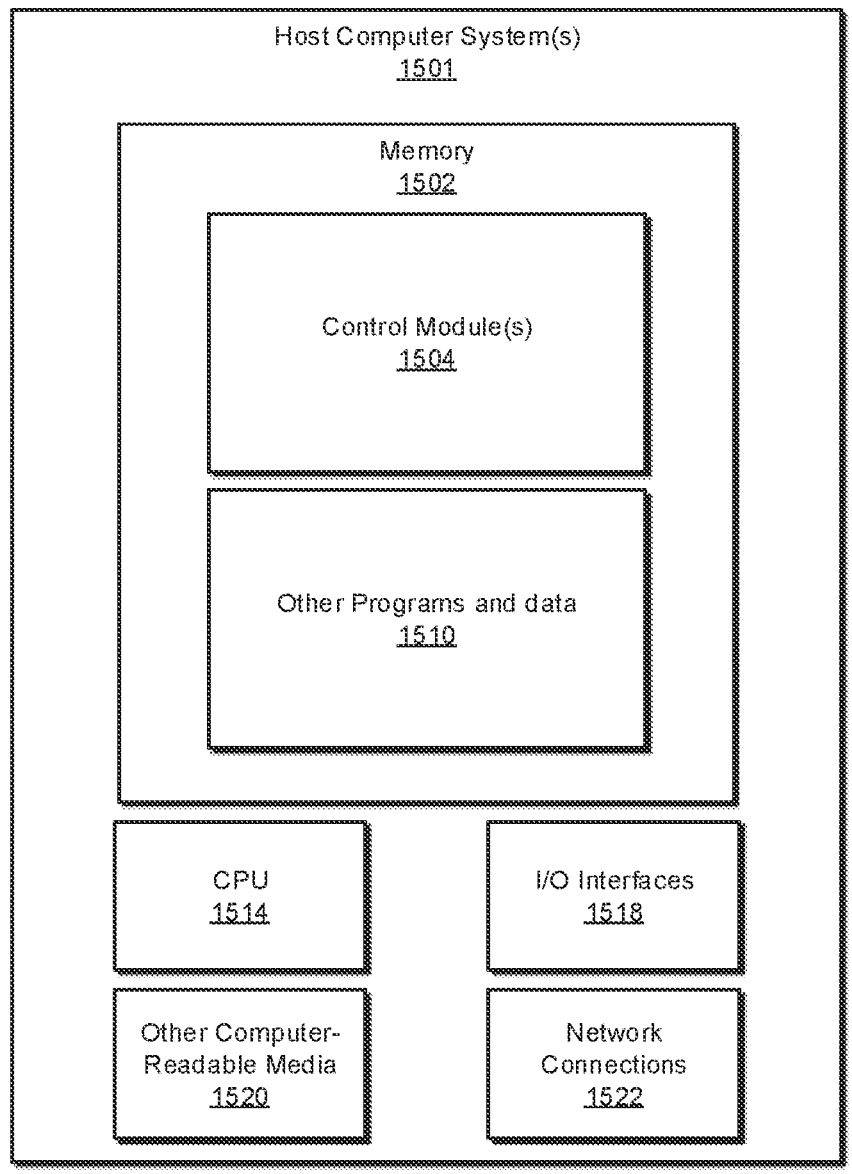
FIG. 15 shows a diagram of an example computing system that may facilitate the performance of one or more of the methods described herein.

FIG. 15 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 15 illustrates an example of underlying hardware on which such software and functionality may be hosted and/or implemented.

In particular, shown is example host computer system(s) 1501. For example, such computer system(s) 1501 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 1501 may include memory 1502, one or more central processing units (CPUs) 1514, I/O interfaces 1518, other computer-readable media 1520, and network connections 1522.

Memory 1502 may include one or more various types of non-volatile and/or volatile storage technologies. Examples of memory 1502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 1502 may be utilized to store information, including computer-readable instructions that are utilized by CPU 1514 to perform actions, including those of embodiments described herein.

Memory 1502 may have stored thereon control module(s) 1504. The control module(s) 1504 may be configured to implement and/or perform some or all of the functions of the systems or components described herein. Memory 1502 may also store other programs and data 1510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 1522 are configured to communicate with other computing devices to facilitate the functionality described herein. In various embodiments, the network connections 1522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 1518 may include a video interface, other data input or output interfaces, or the like. Other computer-readable media 1520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    initiating a cellular field testing tool that tests a condition of cellular network connectivity of a device under test;
    checking, prior to starting a specific test of the cellular field testing tool, whether each precondition in a set of preconditions is satisfied; and
    preventing the cellular field testing tool from starting the specific test until each precondition in the set of preconditions is satisfied;
    wherein:
    a specific precondition in the set of preconditions indicates an attribute of a location where the device under test is located or an attribute of cellular network connectivity of the device under test;
    the specific precondition within the set of preconditions tests a value specifying at least one of:
    latitude or longitude coordinates;
    radiofrequency conditions;
    an identifier of a modulation scheme;
    an absolute radiofrequency channel number;
    a physical cell ID;
    a measurement of bandwidth; or
    a carrier aggregation band combination.

2. The method of claim 1, wherein the set of preconditions comprises at least two preconditions.

3. The method of claim 1, wherein the specific precondition within the set of preconditions tests a value relating to at least one of:
    the identifier of a modulation scheme;
    the absolute radiofrequency channel number;
    the physical cell ID; or
    the carrier aggregation band combination.

4. The method of claim 1, further comprising performing a remedial action in an attempt to satisfy each precondition within the set of preconditions.

5. The method of claim 4, further comprising, after performing the remedial action, checking whether each precondition in the set of preconditions is satisfied.

6. The method of claim 4, wherein the remedial action comprises cycling an airplane mode on and off on the device under test.

7. The method of claim 4, wherein the remedial action comprises power cycling the device under test off and on.

8. The method of claim 4, wherein the remedial action comprises raising an audiovisual alarm.

9. The method of claim 1, wherein preventing the cellular field testing tool from starting the specific test comprises disabling a graphical user interface element for starting the specific test.

10. The method of claim 1, wherein the cellular field testing tool operates in part by connecting to both the device under test and a reference device.

11. A system comprising:
a physical computing processor; and
a non-transitory computer-readable medium encoding instructions that, when executed by the physical computing processor, cause a computing device to perform operations comprising:
initiating a cellular field testing tool that tests a condition of cellular network connectivity of a device under test;
checking, prior to starting a specific test of the cellular field testing tool, whether each precondition in a set of preconditions is satisfied; and
preventing the cellular field testing tool from starting the specific test until each precondition in the set of preconditions is satisfied;
wherein:
a specific precondition in the set of preconditions indicates an attribute of a location where the device under test is located or an attribute of cellular network connectivity of the device under test;
the specific precondition within the set of preconditions tests a value specifying at least one of:
latitude or longitude coordinates;
radiofrequency conditions;
an identifier of a modulation scheme;
an absolute radiofrequency channel number;
a physical cell ID;
a measurement of bandwidth; or
a carrier aggregation band combination.

12. The system of claim 11, wherein the set of preconditions comprises at least two preconditions.

13. The system of claim 11, wherein the specific precondition within the set of preconditions tests a value relating to at least one of:
the identifier of a modulation scheme;
the absolute radiofrequency channel number;
the physical cell ID; or
the carrier aggregation band combination.

14. The system of claim 11, wherein the operations further comprise performing a remedial action in an attempt to satisfy each precondition within the set of preconditions.

15. The system of claim 14, wherein the operations further comprise, after performing the remedial action, checking whether each precondition in the set of preconditions is satisfied.

16. The system of claim 14, wherein the remedial action comprises cycling an airplane mode on and off on the device under test.

17. The system of claim 14, wherein the remedial action comprises power cycling the device under test off and on.

18. The system of claim 14, wherein the remedial action comprises raising an audiovisual alarm.

19. The system of claim 11, wherein preventing the cellular field testing tool from starting the specific test comprises disabling a graphical user interface element for starting the specific test.

20. A non-transitory computer-readable medium encoding instructions that, when executed by at least one physical processor of a computing device, cause the computing device to perform operations comprising:
initiating a cellular field testing tool that tests a condition of cellular network connectivity of a device under test;
checking, prior to starting a specific test of the cellular field testing tool, whether each precondition in a set of preconditions is satisfied; and
preventing the cellular field testing tool from starting the specific test until each precondition in the set of preconditions is satisfied;
wherein:
a specific precondition in the set of preconditions indicates an attribute of a location where the device under test is located or an attribute of cellular network connectivity of the device under test;
the specific precondition within the set of preconditions tests a value specifying at least one of:
latitude or longitude coordinates;
radiofrequency conditions:
an identifier of a modulation scheme;
an absolute radiofrequency channel number;
a physical cell ID;
a measurement of bandwidth; or
a carrier aggregation band combination.

* * * * *